US010500827B2

(12) United States Patent
Wang et al.

(10) Patent No.: US 10,500,827 B2
(45) Date of Patent: Dec. 10, 2019

(54) ATTACHMENT DEVICE, ATTACHMENT SYSTEM AND METHOD FOR ATTACHING PROTECTION FILM USING ATTACHMENT SYSTEM (71) Applicants: BOE TECHNOLOGY GROUP CO., LTD., Beijing (CN); BEIJING BOE DISPLAY TECHNOLOGY CO., LTD., Beijing (CN)

(72) Inventors: Yi Wang, Beijing (CN); Ji Zhang, Beijing (CN); Wei Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 115 days.

(21) Appl. No.: 15/690,938

(22) Filed: Aug. 30, 2017

(65) Prior Publication Data
US 2018/0186145 A1 Jul. 5, 2018

(30) Foreign Application Priority Data

Jan. 3, 2017 (CN) .................... 2017 2 0004110 U (51) Int. Cl.
B32B 38/10 (2006.01)
B32B 7/06 (2019.01)
B32B 38/18 (2006.01)
G02F 1/13 (2006.01)
(52) U.S. Cl.
CPC ............... *B32B 38/10* (2013.01); *B32B 7/06* (2013.01); *B32B 38/1841* (2013.01); *B32B 2457/202* (2013.01); *G02F 1/1303* (2013.01)

(58) Field of Classification Search
USPC ....... 156/249, 289, 534, 538, 579, 580, 582, 156/583.91
See application file for complete search history.

(56) References Cited

U.S. PATENT DOCUMENTS

| 4,077,830 | A | * | 3/1978 | Fulwiler | G03C 11/08 156/249 |
| 4,312,444 | A | * | 1/1982 | Mushovic | B29D 99/0035 193/37 |
| 8,196,980 | B1 | * | 6/2012 | Banks | A01K 23/005 294/1.3 |

FOREIGN PATENT DOCUMENTS

JP 2006276589 A * 10/2006 ............... G09F 9/00

OTHER PUBLICATIONS

English Abstract of JP 2006-276589 (Year: 2019).*
Machine Translation of JP 2006-276589 (Year: 2019).*

* cited by examiner

*Primary Examiner* — Sing P Chan
(74) *Attorney, Agent, or Firm* — Brooks Kushman P.C.

(57) ABSTRACT

The present disclosure provides an attachment device, an attachment system and a method for attaching a protection film using the attachment system. The attachment device includes an adsorption stage and a handle fixedly connected to the adsorption stage, wherein the adsorption stage is provided with an adsorption surface and a suction hole, and the suction hole is communicated with a plurality of adsorption mouths in the adsorption surface and is configured to connect to a suction device.

12 Claims, 5 Drawing Sheets

ATTACHMENT DEVICE, ATTACHMENT SYSTEM AND METHOD FOR ATTACHING PROTECTION FILM USING ATTACHMENT SYSTEM

CROSS-REFERENCE TO RELATED APPLICATION

The present application claims priority to Chinese patent application No. 201720004110.4 filed on Jan. 3, 2017, which is incorporated herein by reference in its entirety.

TECHNICAL FIELD

The present disclosure relates to the field of display technology, in particular to an attachment device, an attachment system and a method for attaching a protection film using the attachment system.

BACKGROUND

Due to such advantages as small volume, low power consumption and being free of radiation, a liquid crystal display (LCD) has become a dominant product in the display field.

During the manufacture, in order to ensure a normal operation of a final LCD, it is necessary to detect an LCD module after formation of the module, and a defective product need to be reworked.

In a reworking process, a large number of protection films need to be attached, so as to protect non-defective portions of the defective product in the case of repairing a defective portion of the defective product. Currently, the protection film is usually attached manually. On one hand, due to a non-standard operation, in the case that the protection film is picked up, folds may occur at a surface of the protection film and thereby the protection film may be damaged, resulting in an increase in the manufacture cost. On the other hand, in the case that the protection film is picked up by hand, a foreign matter on gloves may be adhered onto an inner side of the protection film, thereby adversely affecting the protection effect by the foreign matter.

SUMMARY

According to at least one embodiment, the present disclosure provides an attachment device, an attachment system and a method for attaching a protection film using the attachment system.

In one aspect, the present disclosure provides in some embodiments an attachment device, including an adsorption stage and a handle fixedly connected to the adsorption stage, wherein the adsorption stage is provided with an adsorption surface and a suction hole, and the suction hole is communicated with a plurality of adsorption mouths in the adsorption surface and is configured to connect with a suction device.

In a possible embodiment of the present disclosure, the attachment device further includes a roller arranged at a side of the adsorption stage.

In a possible embodiment of the present disclosure the roller includes a body, a roller shaft and a bearing, the body is sleeved onto the roller shaft and capable of rotating around the roller shaft, and the bearing is sleeved onto the roller shaft.

In a possible embodiment of the present disclosure, the adsorption stage is further provided, at the side where the roller is arranged, with two lugs arranged opposite to each other, the roller shaft is passed through the two lugs and is secured to the adsorption stage, and the bearing is embedded into a groove in each of the two lugs. Further, the roller shaft is secured to the adsorption stage through a nut.

In a possible embodiment of the present disclosure, a side surface of the adsorption stage where the roller is arranged is inclined relative to, or perpendicular to, the adsorption surface.

In a possible embodiment of the present disclosure, the adsorption stage is of a hollow structure.

In a possible embodiment of the present disclosure, each of the plurality of adsorption mouths is a hole.

In a possible embodiment of the present disclosure, the plurality of adsorption mouths is arranged evenly in the adsorption surface.

In a possible embodiment of the present disclosure, the adsorption surface has a size smaller than or equal to 14 inches.

In a possible embodiment of the present disclosure, the adsorption surface has a size smaller than or equal to that of a display panel.

In another aspect, the present disclosure provides in some embodiments an attachment system including any one of the above-mentioned attachment devices, and a suction device configured to provide a suction force to the plurality of adsorption mouths through the suction hole.

In a possible embodiment of the present disclosure, one suction device is connected to one attachment device, and the suction device includes a suction element and a pipe, one end of which is connected to the suction element and the other end of which is connected to the suction hole.

In a possible embodiment of the present disclosure, the handle is provided with a first control button configured to turn on or off the suction device.

In a possible embodiment of the present disclosure, one suction device is connected to a plurality of attachment devices, the suction device includes a suction element, a pipeline and a plurality of pipes, the pipeline is connected to the suction element, one end of each pipe is connected to the pipeline, and the other end of each pipe is connected to the suction hole of the attachment device.

In a possible embodiment of the present disclosure, the attachment system further includes a valve arranged at a side of each pipe adjacent to the attachment device and configured to enable or disable communication between the pipe and the pipeline.

In a possible embodiment of the present disclosure, the handle is further provided with a second control button configured to control an opening action or a closing action of the valve.

In yet another aspect, the present disclosure provides in some embodiments a method for attaching a protection film using an attachment system. The attachment system includes an adsorption stage having an adsorption surface and a suction hole, a handle fixedly connected to the adsorption stage, and a suction device. The method includes following steps: generating a suction force at the adsorption surface by turning on the suction device through the handle, so as to adsorb a protection film, the suction hole being connected to the suction device and in communication with a plurality of adsorption mounts in the adsorption surface; removing a release film from the protection film; and attaching the protection film without the release film.

In a possible embodiment of the present disclosure, the suction device includes a suction element and a pipe, one end of which is connected to the suction element and the other end of which is connected to the suction hole. The step of generating a suction force at the adsorption surface by turning on the suction device through the handle includes enabling the suction element to perform a suction operation through a control button on the handle, so as to generate the suction force at the adsorption surface.

In a possible embodiment of the present disclosure, before the attaching the protection film without the release film, the method further includes performing an alignment operation on the protection film.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

| Reference signs: | | | |
|---|---|---|---|
| 01- attachment device | 02- suction device | 100- adsorption stage | |
| 110- adsorption surface | 111- adsorption mouth | 120- suction hole | 130- roller |
| 131- body | 132- roller shaft | 133- bearing | 134- nut | 140- groove |
| 150- lug | 200- handle | 210- first control button | 300- suction element | 310- pipe |

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
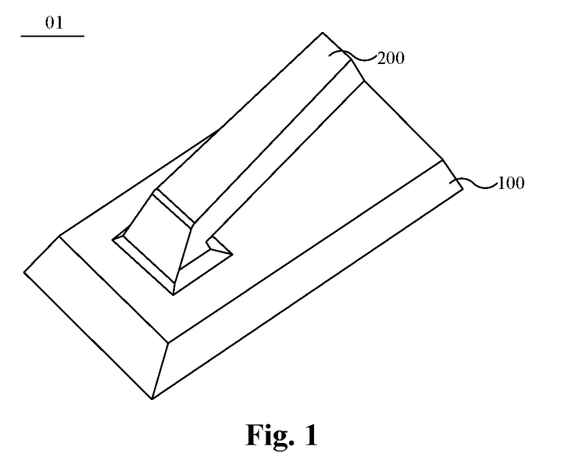
FIG. 1 is a schematic view showing an attachment device according to at least one embodiment of the present disclosure.
Figure 2:
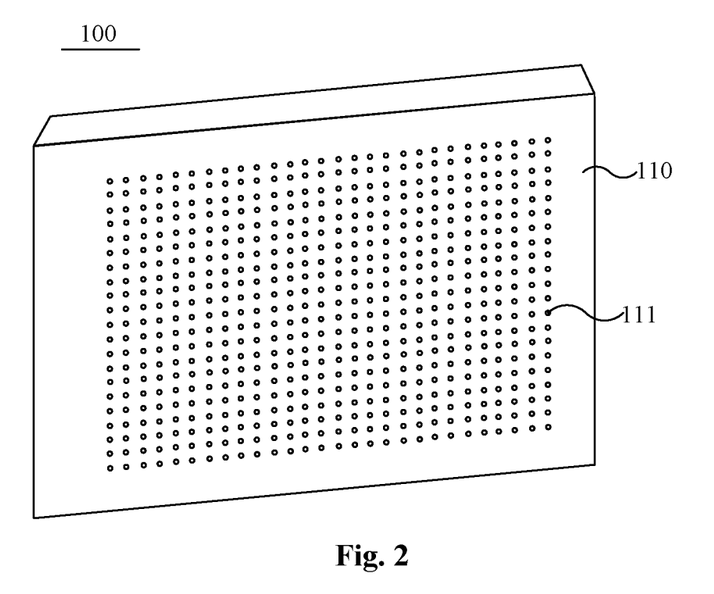
FIG. 2 is a schematic view showing an adsorption surface of an attachment device according to at least one embodiment of the present disclosure.
Figure 3:
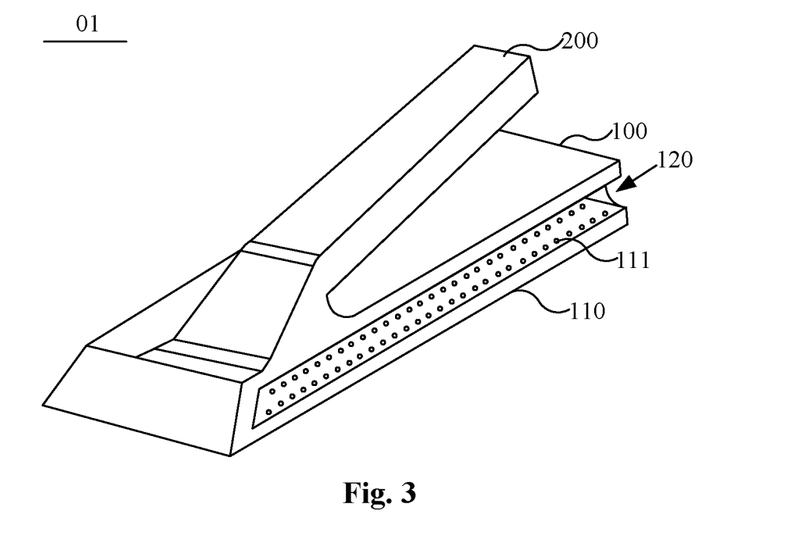
FIG. 3 is a schematic view showing an interior of an adsorption stage of the attachment device according to at least one embodiment of the present disclosure.

The present disclosure provides in some embodiments an attachment device 01 which, as shown in FIGS. 1 to 3, includes an adsorption stage 100 and a handle 200 fixedly connected to the adsorption stage 100. The adsorption stage 100 is provided with an adsorption surface 110 and a suction hole 120 which is communicated with a plurality of adsorption mouths 111 in the adsorption surface 110. The suction hole 120 is configured to connect to a suction device.

The suction device is configured to generate a suction force at the adsorption mounts in the adsorption surface 100, so as to adsorb a protection film.

It should be appreciated that, firstly, in the case that the protection film is adsorbed onto the adsorption surface 100 of the attachment device 01, in order to enable the protection film to be attached to a predetermined position on a panel where the protection film is to be attached, one edge of the protection film may extend beyond the adsorption stage 100. In this way, during the attachment, it is able to perform alignment on the edge of the protection film extending beyond the adsorption stage manually, attach the edge of the protection film on which a release film has been removed onto the panel, and attach the protection film onto the panel by moving the attachment device 01.

In order to ensure an attachment effect, during the movement of the attachment 01, the attachment device 01 may be inclined relative to the panel, so as to enable a peripheral portion of the adsorption stage 100 beyond which the edge of the protection film extends to be in contact with the panel, thereby to discharge air between the protection film and the panel.

Based on the above, a structure of the peripheral portion of the attachment device 01 beyond which the edge of the protection film extends will not be particularly defined, as long as the protection film may not be damaged.

For example, a side surface of the adsorption stage 100 may be designed as an oblique surface, and in the case that the protection film is adsorbed onto the adsorption stage 100, the protection film may extend beyond the oblique surface. In a possible embodiment of the present disclosure, any other mechanism may be arranged at a side of the adsorption stage 100.

Secondly, a shape of the handle 200 and a fixation mode of the handle 200 to the adsorption stage 100 will not be particularly defined, as long as the movement of the adsorption stage 100 may be controlled through the handle 200.

Thirdly, a shape and a size of each adsorption mouth 111 will not be particularly defined, as long as the protection film may be adsorbed onto the adsorption stage 100 with the adsorption mouths 111, without generating any folds.

Fourthly, a communication mode of the suction hole 12 with the adsorption mouths 111 in the adsorption surface 100 will not be particularly defined, as long as the suction device may generate the suction force at the adsorption mouths 111 in the adsorption surface 110 through the suction hole 120.

According to the attachment device 01 in the embodiments of the present disclosure, the adsorption stage 100 is provided with the adsorption surface 110 and the suction hole 120, and the adsorption surface 110 is provided with the adsorption mouths 111 in communicate with the suction hole 120, so as to generate the suction force at the adsorption mouths 111 in the adsorption surface 110 and attach the protection film onto the adsorption surface 110, thereby to reduce probability of damage to the panel due to folds of the protection film caused by improper manual operation. Furthermore, it is able to reduce the time for the attachment of the protection film and to reduce the number of times of contact between hand and the protection film, thereby to reduce the amount of foreign matters on the protection film. In addition, through the attachment of the protection film using the attachment device 01 in the embodiments of the present disclosure, it is able to provide a standard operation procedure, thereby to facilitate the calculation of takt time for the attachment of the protection film.

In a possible embodiment of the present disclosure, as shown in FIG. 1, the handle 200 is arranged at a side of the adsorption stage 100 opposite to the adsorption surface 110.

Figure 4:
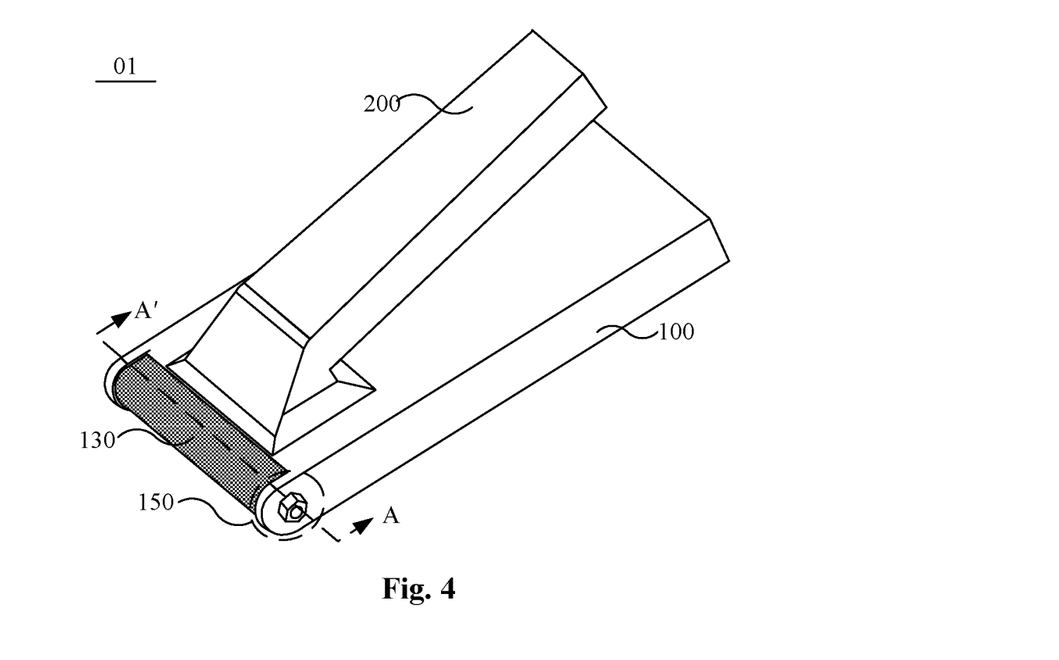
FIG. 4 is a schematic view showing an attachment device according to at least one embodiment of the present disclosure.

In a possible embodiment of the present disclosure, as shown in FIG. 4, the attachment device 01 further includes a roller 130 arranged at one side of the adsorption surface 100.

Figure 5:
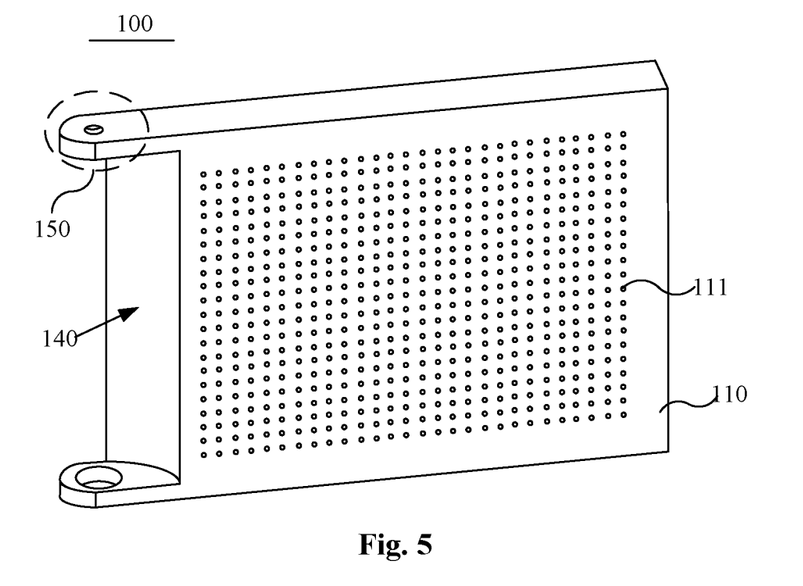
FIG. 5 is schematic view showing an adsorption stage according to at least one embodiment of the present disclosure.

It should be appreciated that, an arrangement mode of the roller 130 will not be particularly defined herein. As shown in FIG. 5, the adsorption stage 100 may be provide with a concave surface to form a groove 140, and the roller 130 may be arranged within the groove 130. Also, as shown in FIG. 6, the adsorption stage 100 may be provided with a vertical surface perpendicular to the adsorption surface 110, and the roller 130 may be arranged on the vertical surface.

Through the roller 130 arranged at one side of the adsorption stage 100, the roller 130 may be in contact with the protection film during the movement of the attachment device 01, so as to discharge the air between the protection film and the panel. In addition, no damage may be caused by the roller 130 to the protection film.

Figure 6:
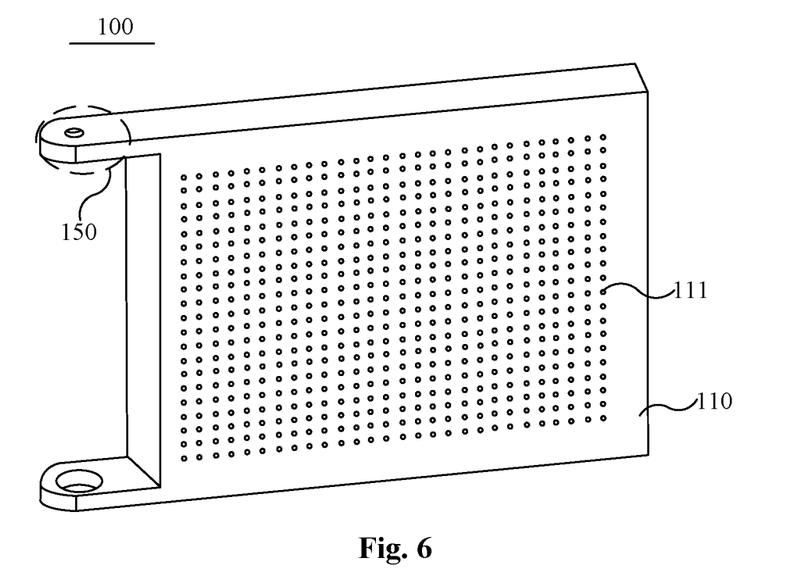
FIG. 6 is a schematic view showing the adsorption stage according to at least one embodiment of the present disclosure.
Figure 7:
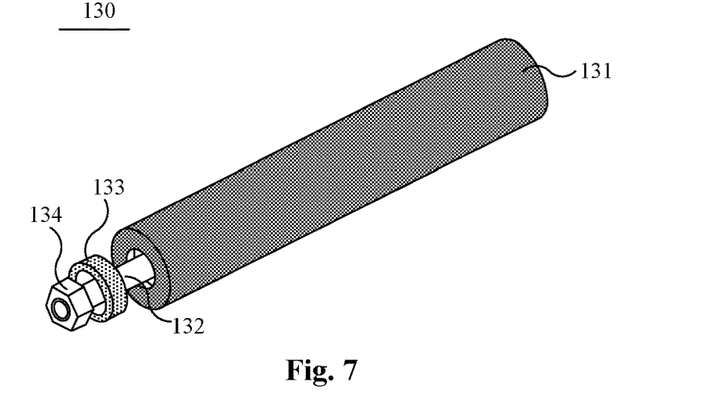
FIG. 7 is a schematic view showing a roller according to at least one embodiment of the present disclosure.
Figure 8:
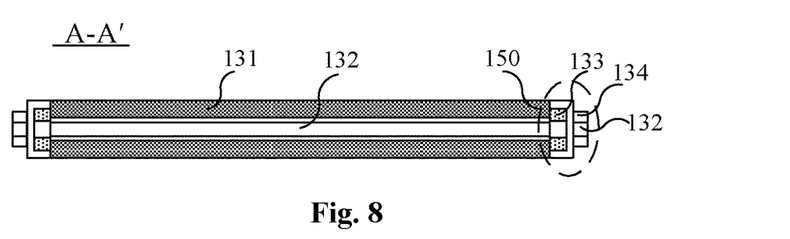
FIG. 8 is sectional view of the attachment device along line AA' in FIG. 4.

In a possible embodiment of the present disclosure, as shown in FIGS. 4 to 6, the adsorption stage 100 is further provided, at the side where the roller 130 is arranged, with two lugs 150 arranged opposite to each other. As shown in FIG. 7, the roller 130 includes a body 131, a roller shaft 132 and a bearing 133. The body 131 is sleeved onto the roller shaft 132 and capable of rotating around the roller shaft 132. The roller shaft 132 passes through the two lugs 150 and is secured to the adsorption stage 100 through a nut 134. The bearing 133 is sleeved onto the roller shaft 132 and embedded into a groove in each of the two lugs 150 (as shown in FIG. 8).

The roller shaft 132 is configured to support shaft 131, the bearing 133 is configured to reduce friction between the roller shaft 132 and the lugs 150, and the nut 134 is configured to secure the roller shaft 132 to the lugs 150.

Based on the above, the roller 130 may further include a sleeve connected to the bearing 133 and configured to fix an inner ring of the bearing 133.

In a possible embodiment of the present disclosure, as shown in FIG. 3, the adsorption stage 100 is of a hollow structure.

According to the embodiments of the present disclosure, in the case that the adsorption stage 100 is of a hollow structure and the suction device performs the suction at the adsorption surface of the adsorption stage 100 through the suction hole 120, it is unnecessary to provide any other channel within the adsorption stage 100, thereby to better the suction effect.

In a possible embodiment of the present disclosure, as shown in FIGS. 2, 5 and 6, each adsorption mouth 111 is a hole, and the adsorption mouths 111 are arranged evenly in the adsorption surface 110.

In the case that the suction device has a relatively large capability and the suction mouths 111 are holes and arranged evenly in the adsorption surface 110, the folds is less likely to occur on the protection film, as compared with the adsorption mouths 111 with any other structures.

In the case that the adsorption stage 100 is of a too large size, it may not be operated conveniently. Hence, for example, the size of the adsorption stage may be set in accordance with a size of a display panel.

In a possible embodiment of the present disclosure, a size of the adsorption surface is not greater than the size of the display panel. For the display panel having a size greater than 14 inches, its performance may not be greatly affected even in the case that a small amount of bubbles exist between the protection film and the display panel. Hence, in a possible embodiment of the present disclosure, the adsorption surface 110 may have a size smaller than or equal to 14 inches.

The present disclosure further provides in some embodiments an attachment system including the above-mentioned attachment device 01 and a suction device.

According to the attachment system in the embodiments of the present disclosure, the adsorption stage 100 of the attachment device 01 is provided with the adsorption surface 110 and the suction hole 120, and the adsorption surface 110 is provided with the plurality of adsorption mouths 111 in communicate with the suction hole 120, so as to generate the suction force at the adsorption mouths 111 in the adsorption surface 110 and adsorb the protection film onto the adsorption surface 110, thereby to reduce probability of damage to the panel due to folds of the protection film caused by improper manual operation. Furthermore, it is able to reduce the time for the attachment of the protection film and to reduce the number of times of contact between hand and the protection film, thereby to reduce the amount of foreign matters on the protection film. In addition, through the attachment of the protection film using the attachment device 01 in the embodiments of the present disclosure, it is able to provide a standard operation procedure, thereby to facilitate the calculation of takt time for the attachment of the protection film.

Based on the above, as compared with a polarizer (POL) laminator, it is able for the attachment system in the embodiments of the present disclosure to align the protection film manually, thereby to reduce the time for the alignment and improve the attachment efficiency. In addition, the attachment system is made inexpensively, and it is able to reduce the manufacture cost.

Figure 9:
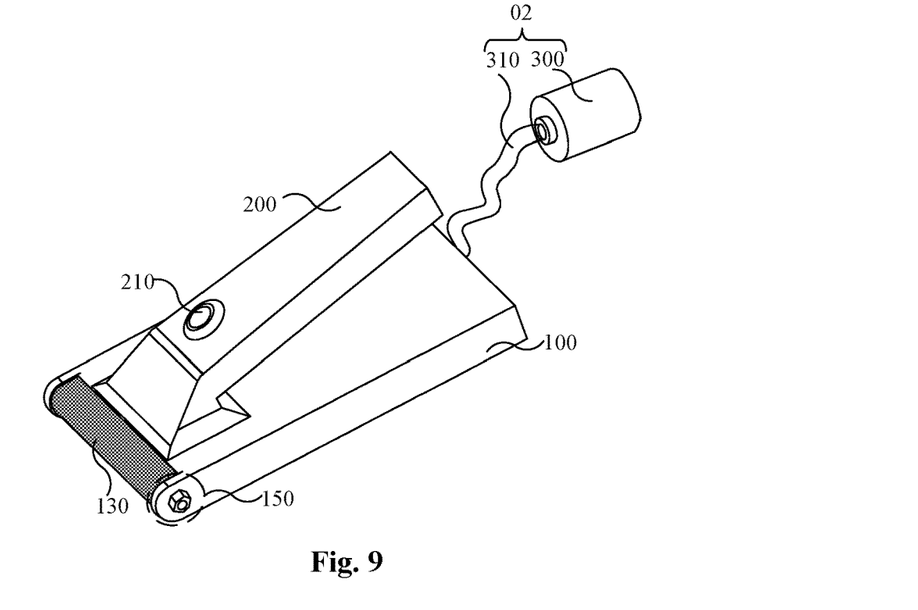
FIG. 9 is a schematic view showing an attachment system according to at least one embodiment of the present disclosure.

In a possible embodiment of the present disclosure, as show in FIG. 9, one suction device 02 is connected to one attachment device 01. The suction device 02 includes a suction element 300 and a pipe 310, one end of which is connected to the suction element 300 and the other end of which is connected to the suction hole 120 of the attachment device 01.

In a possible embodiment of the present disclosure, the pipe 310 may be made of a flexible material, such as rubber.

It should be appreciated that, the structure of the suction element 300 will not be particularly defined herein, as long as it may perform the suction operation to generate the suction force at the adsorption surface of the attachment device 01.

According to at least one embodiment of the present disclosure, in the case that one suction device 02 is connected to one attachment device 01, it is able to operate the attachment system in a more flexible manner.

In a possible embodiment of the present disclosure, as shown in FIG. 9, the handle 200 is provided with a first control button 210 configured to turn on or off the suction device 02.

The first control button 210 may be connected to the suction device 02 through a lead which, for example, may be arranged in the hollow structure of the adsorption stage 100 and on an inner wall of the pipe 310, extend to the suction element 300, and then may be connected to the suction element 300.

According to the embodiments of the present disclosure, the suction device 02 is turned on or off through the first control button 210 on the handle 200, and thus it is able to facilitate the operation.

The present disclosure further provides in some embodiments a method for attaching the protection film using the above-mentioned attachment system, including flowering steps: generating a suction force at the adsorption surface by turning on the suction device through the handle so as to adsorb a protection film; removing a release film from the protection film; and attaching the protection film without the release film.

Figure 10:
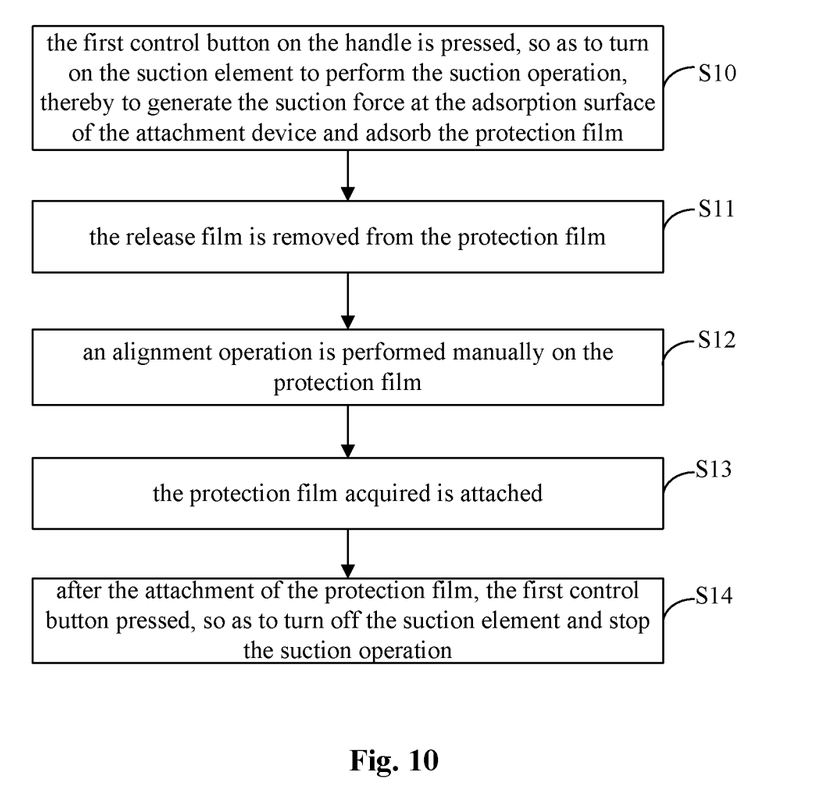
FIG. 10 is a flow chart of a method for attaching a protection film using an attachment system according to at least one embodiment of the present disclosure.

To be specific, as shown in FIG. 10, the method for attaching the protection film using the attachment system in FIG. 8 may include the following steps.

In step S10, the first control button 210 on the handle 200 is pressed, so as to turn on the suction element 300 to perform the suction operation, thereby to generate the suction force at the adsorption surface 110 of the attachment device 01 and adsorb the protection film. It should be appreciated that, the protection film adsorbed onto the attachment device 01 may extend beyond the roller 130.

In step S11, the release film is removed from the protection film acquired in step S10.

In the case that the release film is removed manually, the foreign matters may be adhered onto the protection film, and meanwhile the fold may occur at a corner of the protection film. Hence, in a possible embodiment of the present disclosure, an adhesive tape may be adhered to the corner of the protection film in contact with the adsorption surface 110, and it may extend beyond the protection film, so as to remove the release film from the protection film through the adhesive tape.

In step S12, an alignment operation is performed manually on the protection film acquired in step S11.

To be specific, the alignment operation may be performed through a portion of the protection film extending beyond the roller 130.

In step S13, the protection film acquired in step S12 is attached.

To be specific, the attachment device 01 may be moved, so as to move the roller 130, thereby to attach the protection film.

Of course, without the roller 130, the edge portion of the adsorption stage 100 beyond which the protection film extends may be in contact with the panel, so as to attach the protection film.

In step S14, after the attachment of the protection film in step S13, the first control button 210 is pressed, so as to turn off the suction element 300 and stop the suction operation.

The present disclosure further provides in some embodiments another attachment system. One suction device 02 is connected to a plurality of attachment devices 01. The suction device 02 includes a suction element 300, a pipeline and a plurality of pipes 310. The pipeline is connected to the suction element 300. One end of each pipe 310 is connected to the pipeline, and the other end of each pipe 310 is connected to the suction hole 120 of the attachment device 01. The attachment system further includes a valve arranged at a side of each pipe 310 adjacent to the attachment device 01 and configured to enable or disable communication between the pipe 310 and the pipeline.

It should be appreciated that, a communication mode of the pipe 310 with the pipeline will not be particularly defined herein, as long as each attachment device 01 can be communicated with the pipeline.

In the embodiments of the present disclosure, the suction element 300 is in communication with the pipeline and the plurality of attachment devices 01 is in communication with the pipeline through the pipes 310, so as to enable each attachment device 01 to be in communication with the suction element 300, thereby to enable the suction element 300 to perform the suction operation with respect to the plurality of attachment devices 01. In addition, through the valve arranged at one side of each pipe 310 adjacent to the attachment device 01, it is able to enable or disable communication between each attachment device 01 and the suction element 300, thereby to enable or disable absorption of the protection film by each attachment device 01.

In a possible embodiment of the present disclosure, the handle 200 is further provided with a second control button configured to control an opening action or a closing action of the valve. Through the second control button on the handle 200, it is able to control the opening action or the closing action of the valve, thereby to enable or disable the attachment device 01, and facilitate the operation.

In the embodiments of the present disclosure, an operation procedure of the attachment system is substantially the same as that of the attachment system where one attachment device 01 is connected to one suction element 300. However, the second control button is used to control the opening or closing action of the valve, so as to enable or disable communication between the attachment device 01 and the suction element 300, and specific detail will not be repeated any more herein.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An attachment system, comprising an attachment device and a suction device:
   wherein the attachment device includes an adsorption stage and a handle fixedly connected to the adsorption stage, the adsorption stage is provided with an adsorption surface and a suction hole, and the suction hole is communicated with a plurality of adsorption mouths in the adsorption surface and is configured to connect to the suction device; the suction device is configured to provide a suction force to the plurality of adsorption mouths through the suction hole;
   wherein one suction device is connected to a plurality of attachment devices, the suction device comprises a suction element, a pipeline and a plurality of pipes, the pipeline is connected to the suction element, one end of each pipe is connected to the pipeline, and the other end of each pipe is connected to the suction hole of the attachment device;

wherein the attachment system further includes a valve arranged at a side of each pipe adjacent to the attachment device and configured to enable or disable communication between the pipe and the pipeline.

2. The attachment system according to claim 1, wherein the handle is provided with a first control button configured to turn on or off the suction device.

3. The attachment system according to claim 1, wherein the handle is further provided with a second control button configured to control an opening action or a closing action of the valve.

4. A method for attaching a protection film using an attachment system of claim 1, the method comprises:
   generating a suction force at the adsorption surface by turning on the suction device through the handle, so as to adsorb a protection film, the suction hole being connected to the suction device and in communication with a plurality of adsorption mounts in the adsorption surface;
   removing a release film from the protection film; and
   attaching the protection film without the release film.

5. The method according to claim 4, wherein the suction device comprises a suction element and a pipe, one end of which is connected to the suction element and the other end of which is connected to the suction hole; and
   the generating a suction force at the adsorption surface by turning on the suction device through the handle comprises:
      enabling the suction element to perform a suction operation through a control button on the handle, so as to generate the suction force at the adsorption surface.

6. The method according to claim 4, wherein before the attaching the protection film without the release film, the method further comprises performing an alignment operation on the protection film.

7. The attachment system according to claim 1, wherein the attachment device further includes a roller arranged at a side of the adsorption stage.

8. The attachment system according to claim 7, wherein the roller comprises a body, a roller shaft and a bearing, the body is sleeved onto the roller shaft and capable of rotating around the roller shaft, and the bearing is sleeved onto the roller shaft.

9. The attachment system according to claim 8, wherein the adsorption stage is further provided, at the side where the roller is arranged, with two lugs arranged opposite to each other, the roller shaft is passed through the two lugs and is secured to the adsorption stage, and the bearing is embedded into a groove in each of the two lugs.

10. The attachment system according to claim 9, wherein the roller shaft is secured to the adsorption stage through a nut.

11. The attachment system according to claim 8, wherein a side surface of the adsorption stage where the roller is arranged is inclined relative to, or perpendicular to, the adsorption surface.

12. The attachment system according to claim 1, wherein the adsorption stage is of a hollow structure.

* * * * *